United States Patent [19]

Ohtomo et al.

[11] Patent Number: 4,958,241
[45] Date of Patent: Sep. 18, 1990

[54] IMAGE INPUT APPARATUS

[75] Inventors: Fumio Ohtomo; Hiroyuki Frusho; Shinichi Nakamura; Toshifumi Mihashi, all of Tokyo, Japan

[73] Assignee: Kabushiki Kaisha Topcon, Tokyo, Japan

[21] Appl. No.: 363,762

[22] Filed: Jun. 9, 1989

[30] Foreign Application Priority Data

Jun. 16, 1988 [JP] Japan .................................. 63-146802
Jun. 16, 1988 [JP] Japan .................................. 63-146803

[51] Int. Cl.$^5$ .......................................... H04M 1/04
[52] U.S. Cl. .................................... 358/487; 358/479; 358/496

[58] Field of Search .................... 358/479, 487, 496

[56] References Cited

U.S. PATENT DOCUMENTS 4,673,988 6/1987 Jamssom et al. .................. 358/479

Primary Examiner—Edward L. Coles, Sr.
Attorney, Agent, or Firm—Ronald P. Kananen

[57] ABSTRACT

An image input apparatus includes an image sensor having a two-diminsional photosensitive surface for converting each of two-dimensional image segments into which an image is divided, in a predetermined sequence, to provide digital information regarding each of the image segments.

21 Claims, 6 Drawing Sheets

IMAGE INPUT APPARATUS

BACKGROUND OF THE INVENTION

This invention relates to an image input apparatus for converting an image into digital information.

Image input apparatus have been used to convert an image into digital information for application to an image processing unit or the like. For this purpose, such a conventional image input apparatus includes a drum scanner or an image scanner. The drum scanner projects a light spot on an image source of a photographic paper sheet or a photographic film wound around a drum rotating about its axis. The drum scanner employs a photosensor sensitive to the intensity of the light reflected on or transmitted through the image source. Each time the drum makes a full rotation about its axis, one scan line segment comprised of a series of picture elements (pixels) is inputted and the light spot and the photosensor are moved in a direction normal to the direction of rotation of the drum in order to input the next scan line segment. The image scanner employs a linear charge coupled device (CCD) placed at a position facing to an image source for inputting one scan line segment. The image source is moved with respect to the linear CCD in a direction normal to the direction of scanning of the linear CCD in order to input the next scan line segment.

One problem with these conventional scanners is that its scanning speed is limited because the scanning operation is made in a mechanical manner. This is true particularly when the image is required to be scanned with a high resolution. Also these scanners will be difficult to keep the high resolution and the high accuracy because vibration occur according to the mechanical scanning operation. Additionally, as undesirable effects on the image conversion process with the drum scanner, a slack would occur on the image source wound around the drum. And with the image scanner, it is difficult to scan a large image with a high resolution since it has a limited number of pixels.

Such conventional image input apparatus have been designed to take one scan line segment as the unit of the image. Although this design is satisfactory for inputting the whole area of the image, it is impractical for the case where only a portion of the image is required to be inputted. In this case, conventional image input apparatus require a great number of memory sections for storing unnecessary information regarding the unnecessary portions of the image. This is true particularly when the image is processed with a high resolution and/or when the image has a large size.

In order to process a large number of image information, it is the current practice to transfer a part of the image information stored in an external memory into a computer memory as required. Normally, the computer memory has a capacity of 1 M-bytes or less in view of fast operation. Assuming now that an aerial photography film of 23 cm×23 cm is processed with a 10 micron resolution for a photo survey, the external memory is required to contain about 500 M-bytes for storing the information regarding the whole area of the image. Since the image information regarding the necessary portion of the image is about 60% of the whole area of the image, the external memory is required to contain about 200 M-bytes for storing the information regarding the unnecessary portions of the image. If the digital computer is used to process 1000×1000 pixels (1 M-bytes) as the unit of an image on an aerial photography film, the computer memory is required to contain 1000×23000 bytes (23 M-bytes) for storing digital information regarding to 1000 scan line segments. Accordingly, the computer memory capacity required for one unit of the image increases by 23 times and the operation time required for one unit of the image increases by 23 times.

SUMMARY OF THE INVENTION

It is a primary object of the present invention to provide an image input apparatus which is free from the problems associated with the conventional apparatus.

It is another object of this invention to provide an image input apparatus which can specify a necessary portion of an image to be converted into digital information.

It is yet another object of this invention that the necessary image portion is converted into digital information for each of two-dimensional image segments into which the necessary image portion is divided.

It is a further object of this invention that the digital information regarding each of the image segments is minified at a predetermined minification ratio to form a sampled image of the necessary image portion.

There is provided, in accordance with this invention, an image input apparatus for converting an image on an image source into digital information. The apparatus comprises an image sensor located at a position relative to the image source. The image sensor has a photosensitive surface of a predetermined size. A first means is provided for projecting two-dimensional image segments into which the image is divided, in a predetermined sequence, onto the photosensitive surface of the image sensor. Each of the image segments has a size corresponding to the predetermined size of the photosensitive surface. The image sensor converts an image segment projected on the photosensitive surface into an electric signal. A second means is provided for converting the electric signal into digital information of an array of pixels regarding the projected image segment. The second means includes means for holding the relative position between the image source and the image sensor for an interval of time required for the second means to convert the electric signal into the digital information.

In one aspect of the invention, the pixels are arranged along axes on the photosensitive surface of the image sensor. The image is divided into an array of image segments arranged along the set of axes.

In another aspect of the invention, the first means includes means for specifying a portion of the image, and means for dividing the specified image portion into image segments each having a size corresponding to the predetermined size of the photosensitive surface.

In still another aspect of the invention, the second means includes a random access memory for storing the converted digital information regarding the projected image segment. The random access memory stores the digital information for all of the image segments.

In a further aspect of the invention, the second means includes means for minifying the converted digital information at a predetermined minification ratio to form minified information of a sampled image of the image segment.

BRIEF DESCRIPTION OF THE DRAWINGS

This invention will be described in greater detail by reference to the following description taken in connection with the accompanying drawings, in which like reference numerals refer to the same parts, and wherein.

DETAILED DESCRIPTION OF THE INVENTION

Figure 1:
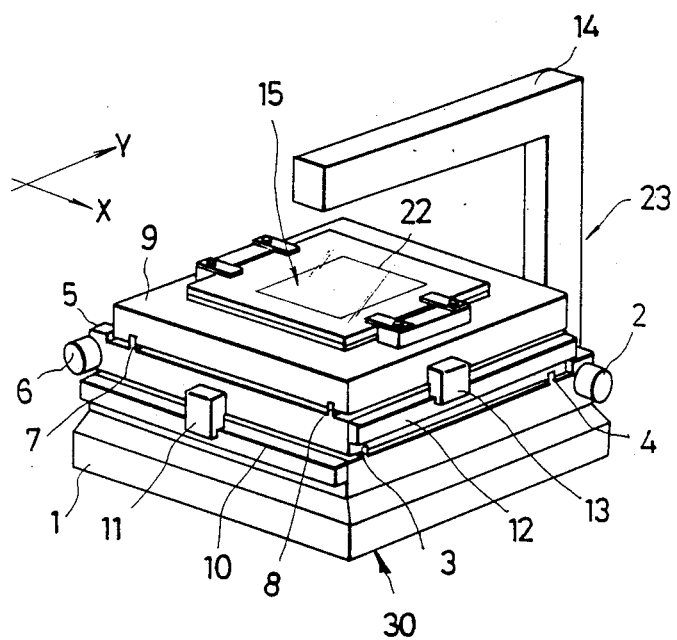
FIG. 1 is a perspective view of a document table used in one embodiment of an image input apparatus made in accordance with the invention.

With reference to the drawings, wherein like numerals refer to like parts in the several views, and in particular to FIG. 1, there is shown a document table with which the present invention may be employed. The document table includes a base 1. The base 1 carries a carriage 5 which is slidable along guide rails 3 and 4 formed on the base 1. This back and forth motion of the carriage 5 is here termed movement along X axis. To produce this motion of the carriage 5 along the X axis, an X feed motor 2 is provided. The X position of the carriage 5 along the X axis is sensed by an X position sensor 11 fixed on the carriage 5, the X position sensor being associated with a linear encoder 10 fixed on the base 1. With movement of the carriage 5 along the X axis, the X position sensor 11 moves with respect to the linear encoder 10. Then the X position sensor produces a series of pulses, the number of which corresponds to the X-axis displacement of the carriage 5 from its initial position.

The carriage 5 carries a cross slide 9 which is slidable along guide rails 7 and 8 formed on the carriage 5. This motion is here termed movement along Y axis. To produce this motion of the cross slide 9 along the Y axis, a Y feed motor 6 is provided. The Y position of the cross slide 9 along the Y axis is sensed by a Y position sensor 13 fixed on the cross slide 9, the Y position sensor 13 being associated with a linear encoder 12 fixed on the carriage 5. With movement of the cross slide 9 along the Y axis, the Y position sensor 13 moves with respect to the linear encoder 12. Then the Y position sensor produces a series of pulses, the number of which corresponds to the Y-axis displacement of the cross slide 9 from its initial position.

A film holder 15 is fixed on the cross slide 9 with no showing screws. Thus, movement of the carriage 5 on the base 1 and movement of the cross slide 9 on the carriage 5 can produce motion of the film holder 15 in the X- and Y-axis directions at right angles. The film holder 15 holds an image source of a photographic film 22. The image on the photographic film 22 is projected by an image projector onto an image sensor to be described later. The image projector comprises a lighting section 23 contained in a hollow arm 14 secured on the base 1, and an image focusing section 30 contained in the base 1.

Figure 2:
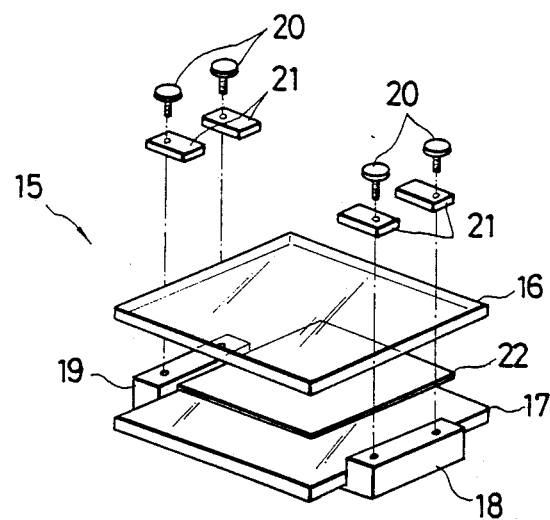
FIG. 2 is a perspective view showing the film holder used in the document table of FIG. 1.

Referring to FIG. 2, the film holder 15 comprises a pair of glass plates 16 and 17, two mounting blocks 18 and 19, and a clamping means. The clamping means includes a pair of clamping plates 21 detachably secured, by means of respective bolts 20, to the mounting block 18 and another pair of clamping plates 21 likely secured, to the mounting block 19. With this structure of the film holder 15, the photographic film 22, which is sandwiched between the glass plates 16 and 17, can be fixed securely without a slack etc.

Figure 3:
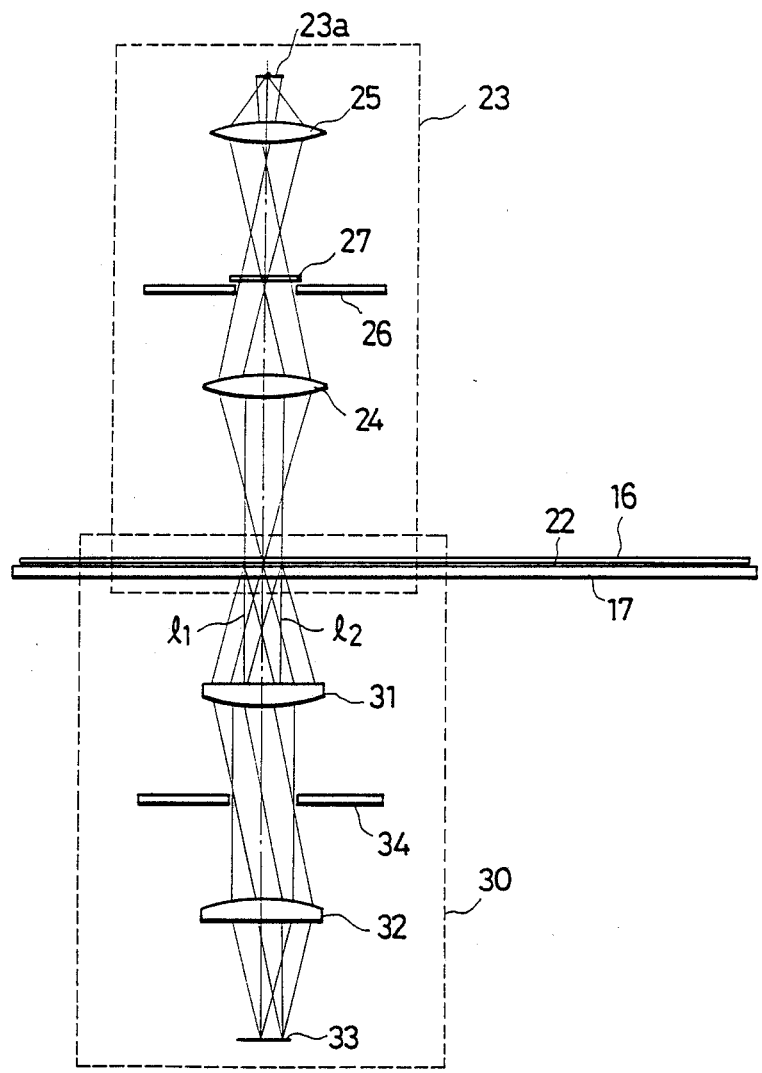
FIG. 3 is a side view showing the image projector contained in the document table.

Referring to FIG. 3, the lighting section, generally designated by the numeral 23, comprises a lamp 23a, a combination of lenses 24 and 25, and an iris 26 provided at the focal point of the lens 25 which is located at a position providing a conjugate relationship between the lamp 23a and the focal point of the lens 24 to provide uniform lighting on a limited area of the photographic film 22. The light generated by the lamp 23a is collimated by the lens combination and directed toward the limited area of the photographic film 22. A diffusing plate 27 is provided adjacent to the iris 26 in order to ensure the uniform lighting on the photographic film 22.

The image focusing section, generally designated by the numeral 30, comprises a combination of lenses 31 and 32, and an iris 34 provided at the focal point of the lens 31. The lenses 31 and 32 are identical lenses located to form a symmetrical arrangement so as to eliminate distortions and other asymmetrical aberrations. The image on the limited area of the photographic film 22 is projected through the lens combination onto a solid state image sensor 33 such as an area charge coupled device (CCD). With such a one-magnification telecentric optical system, the principal rays 11, 12, . . . are parallel to the optic axis. Thus, the size of the image focused on the image sensor 33 is unaffected by variations in the distance between the photographic film 22 and the lens 31. It means that the size of the image projected on the image sensor 33 is independent on the refractive index and thus the thickness of the glass plate 17.

While the image projector has been shown and described in connection with a transmission system, it is to be appreciated, of course, that the image projector may be taken in the form of a refractive system. In this case, only the plate 17 may be a glass plate.

Figure 4:
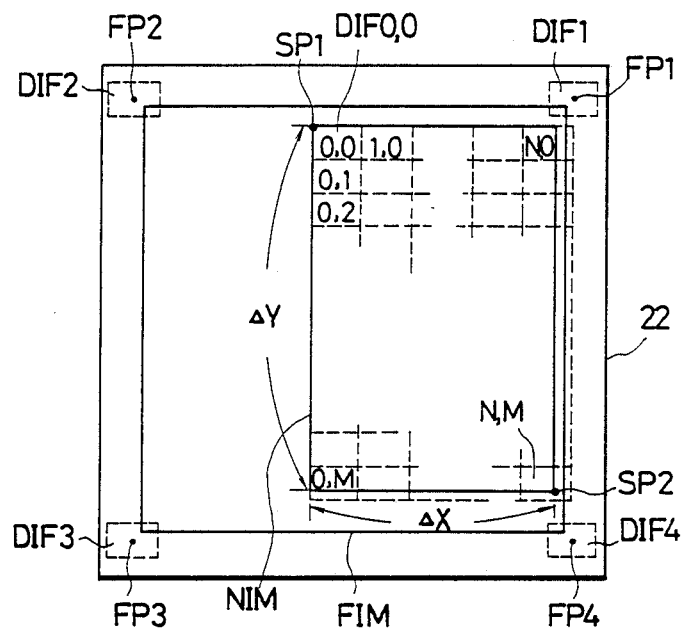
FIG. 4 is a plan view used in explaining necessary data to be converted into digital information.

Referring to FIG. 4, the photographic film 22 is taken in the form of an aerial photography film having an image area FIM surrounded by a frame having areas DIF1, DIF2, DIF3 and DIF4 with respective "Fiducial mark" FP1, FP2, FP3 and FP4. Assuming now that the necessary information is included on a portion NIM in the image area FIM, this information is required to be inputted along with the "Fiducial image" DIF1, DIF2, DIF3 and DIF4. Since the "Fiducial mark" FP1, FP2, FP3 and FP4 are at predetermined positions on the frame, it is possible to input the "Fiducial image" DIF1, DIF2, DIF3 and DIF4 by inputting, through face to face communication with a digital computer, data approximately specifying the coordinates of the respective "Fiducial mark" FP1, FP2, FP3 and FP4 or by programming the digital computer to input these "Fiducial image" automatically at the start of the image input operation. In this case, it is required to set the photographic film 22 in place on the film holder 15. This requirement can be satisfied merely by providing positioning marks on the film holder 15. The necessary image area NIM is specified by points SP1 and SP2 on the diagonal corners of the area NIM. The necessary image area NIM is divided into an M+1×N+1 array of two-dimensional image segments. Each of the image segments can be represented by its coordinates. In two dimensions the coordinates can be specified as the elements of a column, row matrix [x,y]. The information on these image segments is inputted in a predetermined sequence, for example, S(0,0), . . . S(N,0), (0,1), . . . S(N,M).

Figure 5:
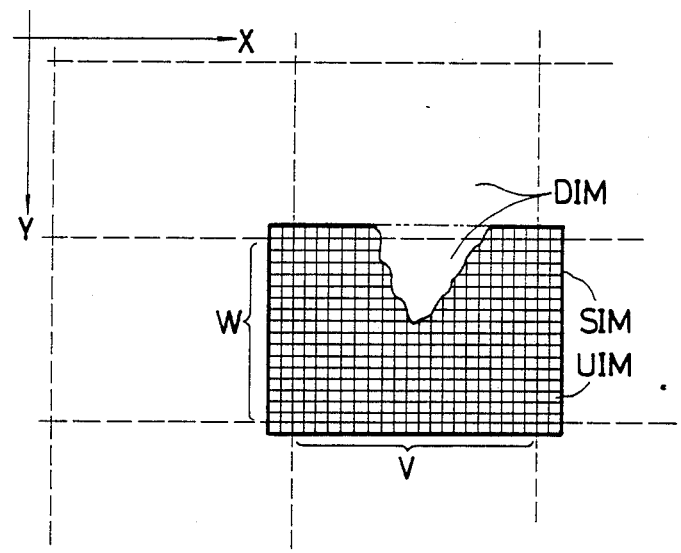
FIG. 5 is a plan view used in explaining the position of the image sensor with respect to an image segment to be converted.

Referring to FIG. 5, the image sensor 33 has a photosensitive surface SIM of a predetermined size including a V×W array of pixels UIM which form image information regarding one image segment. These pixels are arranged along X and Y axes. The necessary image area is divided into an array of two-dimensional image segments DIM arranged along the X and Y axes. The X axis is parallel to the horizontal direction of the photosensitive surface of the image sensor 33 and also to the direction of movement of the carriage 5. The Y axis is parallel to the vertical direction of the photosensitive surface of the image sensor 33 and also to the direction of movement of the cross slide 9. The image segments have a size smaller than the size of the photosensitive surface SIM of the image sensor 33. The image segments DIM have a width which raise the distance between adjacent two pixels to the nth power and a length which integral of the distance between adjacent two pixels to the nth power for a simple minifying operation. The image source 22 is held in a fixed position with respect to the image sensor 33, as shown in FIG. 5, when a selected one of the image segments DIM is converted into digital form. The image source 22 is moved to bring the image segments DIM in a predetermined sequence to the fixed position.

Figure 6:
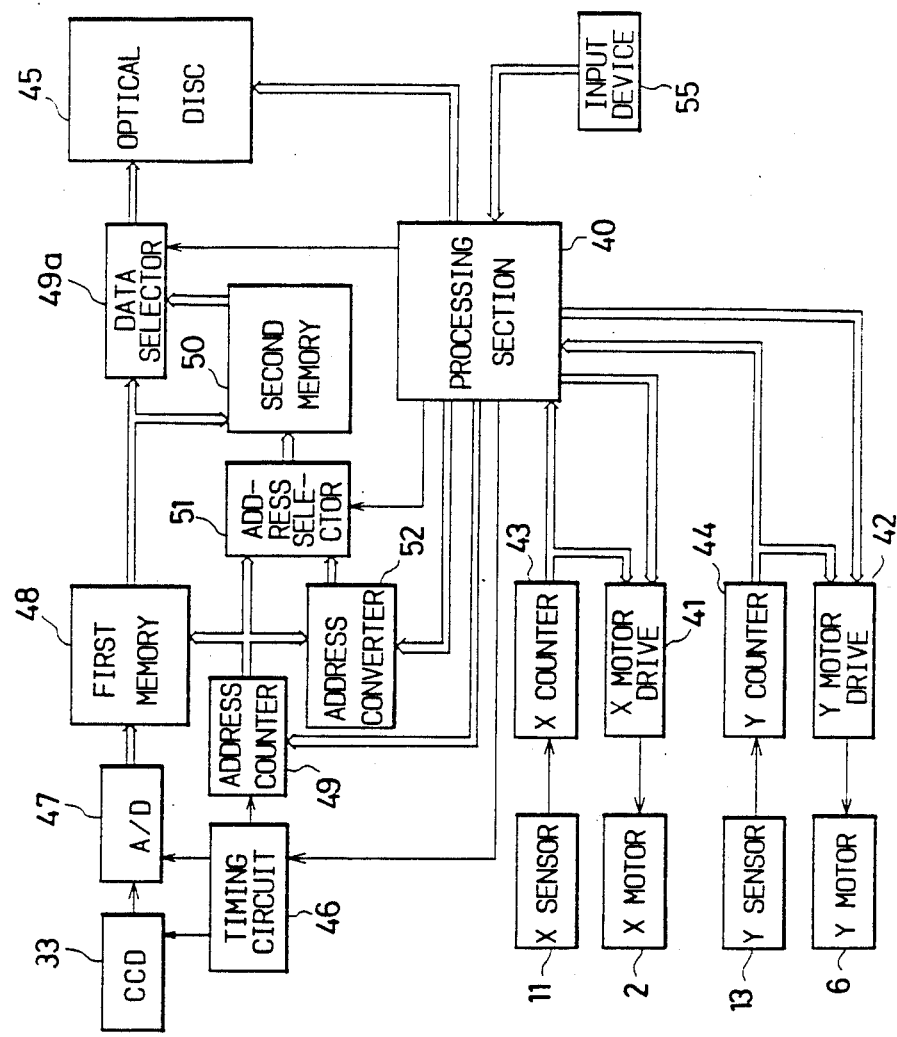
FIG. 6 is a block diagram showing an electrical circuit used in the image input apparatus.

Referring to FIG. 6, the X motor 2 and the X position sensor 11 constitute an X servo system together with an X motor drive circuit 41 and an X counter 43. Similarly, the Y motor 6 and the Y position sensor 13 constitute a Y servo system together with a Y motor drive circuit 42 and a Y counter 44. The X and Y servo systems are controlled by a processing section 40. The processing section 40 calculates required values for the X and Y positions of the document table based on a demand inputted thereto through an input device 55. The calculated X position value is transferred from the processing section 40 to the X motor drive circuit 41 which thereby operates the X motor 2 to move the carriage 5 along the X axis. The X counter 43 counts pulses generated from the X position sensor 11. Thus, the X counter 43 accumulates a count corresponding to the actual X position of the carriage 5 with respect to its initial position. The count of the X counter 43 is transferred to the X motor drive circuit 41. The X motor drive circuit 41 stops the X motor 2 when the count of the X counter 43 coincides with the calculated X position value transferred thereto from the processing section 40. At the same time, the calculated Y position value is transferred from the processing section 40 to the X motor drive circuit 42 which thereby operates the Y motor 6 to move the cross slide 9 along the Y axis. The Y counter 44 counts pulses generated from the Y position sensor 13. Thus, the Y counter 44 accumulates a count corresponding to the actual Y position of the cross slide 9 with respect to its initial position. The count of the Y counter 44 is transferred to the Y motor drive circuit 42. The Y motor drive circuit 42 stops the Y motor 6 when the count of the Y counter 44 coincides with the calculated Y position value transferred thereto from the calculated Y position value transferred through from the processing unit 40. The counts of the X and Y counters 43 and 44 are transferred also to the processing section 40 which stores them into a random access memory in the form of an optical disc 45 as required.

The image sensor 33, which carries a V×W array of pixels forming the information regarding one image segment projected on its photosensitive surface, converts light energy on a pixel into a corresponding electric signal in response to each of timing pulses generated from a timing circuit 46. This conversion is made repetitively for all of the pixels in a predetermined order, for example, left-to-right and top-to-bottom. This electric signal is applied to an analog-to-digital converter 47 which converts it into digital form for application to a first memory 48. The timing pulse is applied from the timing circuit 46 to the analog-to-digital converter 47 so as to synchronize this conversion with the conversion of the image sensor 33. The timing pulse is also applied to an address counter 49 which counts the timing pulses generated from the timing circuit 46 and accumulates a count indicative of the x (column) and y (row) address corresponding to the position of the pixel converted. For this purpose, the address counter 49 includes x and y counters. The x counter increments once each time a timing pulse is generated from the timing circuit 46. The x counter generates a carry for every a predetermined number, in this case V, of timing pulses. The y counter increments once each time a carry is generated from the x counter. The y counter is cleared after it counts a predetermined number, in this case W of carrys. The numbers V and W, which corresponds to the effective memory section of the first memory 48, are changed on a command fed from the processing section 40 to the address counter 49. The count of the address counter 49 is transferred to permit the first memory 48 to store the digital signal at a location specified by the x and y counters.

The information regarding the image segment are transferred from the first memory 48 to a second memory 50 and also through a data selector 49a to a random access memory in the form of an optical disc 50. This transferring operation is made on a command fed to the timing circuit 46 from the processing section 40. The function of the data selector 49a is to selectively connect one of the first and second memories 48 and 50 to the optical disc 45 on a command fed thereto from the processing unit 40.

The second memory 50 is used to form a sampled image to which the image segment is minified at a predetermined minification coefficient. The secondary memory 50 is connected through an address selector 51 to an address converter 52 which serves to address the second memory 50.

A value of one of each of 16×16 arrays of pixels may be sampled to form the sampled image. Also, the sampled image may be formed by averaging the value of each of 16×16 arrays of pixels, for example. The former operation will be explained for the simplification purpose.

The address selector 51 sends an output signal to the secondary memory 50 according to a command signal from the processing unit 40. The address converter 52 serves to address the secondary memory 50 for obtaining the sampled image. That is, the address converter 52 can operate in such a manner that an output count value from the address counter 49 is multiplied by a sampling coefficient and then the output count value added to an initial address count in the processing unit 40 is output.

Assuming now that the sampling coefficient set is 16 and the initial x and y address counts set are 0,0 (row address, column address), the output count value of the address converter 52 increments once from the initial count 0,0 (row address, column address) in a sequence when each time the output count value of the address counter 49 increments 16 times. That is, the information regarding the image segment is sequentially supplied from the first memory 48 to the second memory 50 according to the information regarding the address counter 49. The output counts from the address converter 52 are the same in the micro image area specified by the 16×16 arrays of pixels. Therefore, the information regarding the last pixel transferred from the micro image area is stored in the secondary memory 50. Accordingly, the secondary memory 50 stores the information regarding the image segment sampled to 1/16 when all of the information regarding the image segment is transferred.

The sampled image segment is stored in the predetermined position of the secondary memory 50. The initial address of the predetermined position is the initial address provided by the processing unit 40.

Incidentally, the image segment may be also sampled to 1/16 by shifting the output of the address counter 49 four bits toward the least significant bit portion.

The digital information regarding the image segment is transferred from the first memory 48 to the optical disc 45 as required. The optical disc 45 stores the digital information regarding the image segment including the location thereof relative to the X and Y axes each time digital information regarding an image segment is transferred thereto. Accordingly, the optical disc 45 stores the digital information for all of the image segments including the respective locations thereof relative to the X and Y axes to form information regarding the necessary image portion. The digital information regarding the image segment is also transferred from the first memory 48 to the second memory 50. The second memory 50 stores minified information regarding the image segment.

Each time the digital information of an image segment is transferred to the optical disc 45, the minified information regarding to the image segment is formed in the second memory 50. The minified information regarding all of the image segments is transferred from the second memory 50 to the optical disc 45 on a command produced from the processing section 40 when the digital information regarding all of the image segments is transferred to the optical disc 45. The minified information regarding to an image segment stored in the optical disc 45 may be used as an index for the image segment.

The operation is as follows: The operator inputs a minification coefficient (in this case 16) and data points SP1 and SP2 (FIG. 4) through the input device 55 to the processing section 40, these data points SP1 and SP2 being represented as coordinate pairs $(X_1, Y_1)$ and $(X_2, Y_2)$. The processing section 40 calculates the width $\Delta X$ of the necessary portion of the image area as $\Delta X = X_2 - X_1$ and the length thereof as $\Delta Y = Y_2 - Y_1$. The processing section 40 then calculates the number n of the image segments arranged along the X axis by dividing the width $\Delta X$ by the width of each of the image segments and The number m of the image segments arranged along Y axis by dividing the length $\Delta Y$ by the length W of each of the image segments (wherein n=N+1, m=M30 1).

The processing section 40 calculates values for the X and Y positions of the document table at which the image segment (0,0) is at the fixed position with respect to the image sensor 33. The calculated X position value is transferred tot eh X motor drive circuit 41 which thereby operates the X motor 2 to move the carriage 5 along the X axis. The X motor stops when the count of the X counter 43 coincides with the calculated X position value transferred thereto from the processing section 40. Similarly, the calculated Y position value is transferred from the processing section 40 to the Y motor drive circuit 42 which thereby operates the Y motor 6 to move the cross slide 9 along the Y axis. The Y motor 6 stops when the count of the Y counter 44 coincides with the calculated Y position value transferred thereto from the processing section 40.

When the image segment (0,0) is held at the fixed position with respect to the image sensor 33, it is projected onto the photosensitive surface of the image sensor 33 which thereby convert into the electric signal. Then its signal is transferred through the analog-to-digital converter 47 into the first memory 48.

The processing unit 40 makes calculations of $(V \times n)/16$ and $(W \times m)/16$ to provide initial x' and y' counts (addresses for the minified information regarding the respective image segments). The calculated initial address values are transferred to the address converter 52. When the processing section 40 produces a command to the data selector 49l, the digital information regarding the image segment (0,0) is transferred from the first memory 48 to the optical disc 45. At this time, the second memory 50 stores the minified information regarding the image segment (0,0) formed therein. IN this case, the counts of the X and Y counters 43 and 44 may be transferred to the optical disc 45 in order to ensure the position of the image segment. This sequence is repeated for each of the image segments into which the necessary image area is divided. Upon completion of the sequence for the last image segment (N,M), the optical disc 45 stores the information regarding all of the image segments and the second memory 50 stores the minified information regarding all the image segments. When the processing unit 40 produces a command to the data selector 49l, the minified information is transferred from the second memory 50 to the optical disc 45.

The image input apparatus of the invention is arranged to read only image information regarding a necessary portion of the image area. Thus, it is possible to reduce the required number of memory sections and the time required to read, write and transfer the information to a considerable extent.

The image input apparatus of the invention is arranged to read image information for each of the image segments into which the necessary image area is divided. This arrangement is effective to reduce the required capacity of the computer memory and the required computer operation time to a great extent.

The image input apparatus of the invention is arranged to employ a solid state image sensor for converting one of the image segments into an electric signal. This image sensor requires a small area on which the image is projected. Therefore, this arrangement is free from the influence of lens distortions. In addition, since the image sensor and the image source are held stationary when the image information regarding one image segment is read. Therefore, this arrangement is free from the influence of vibrations.

While the invention has been described in conjunction with a specific embodiment, modifications and evident that many alternatives, modifications and variations will be apparent to those skilled in the art. Accordingly, it is intended to embrace all alternatives, modifications and variations that fall within the scope of the appended claims.

What is claimed is:

1. An image input apparatus for converting an image on an image source into digital information, comprising:
   an image sensor located at a position relative to the image source, the image sensor having a photosensitive surface of a predetermined size;
   first means for projecting two-dimensional image segments into which the image is divided, in a predetermined sequence onto the photosensitive surface of the image sensor, each of the image segments having a size corresponding to the predetermined size of the photosensitive surface;
   the image sensor converting an image segment projected on the photosensitive surface into an electric signal;
   second means for converting the electric signal into digital information of an array of pixels regarding the projected image segment;
   the second means including means for minifying the converted digital information at a predetermined minification ratio to form minimized information of a sampled image of the image segment in such a manner that a value of one of each of N×N arrays of pixels may be sampled to form the sampled image and then the sampled image may be formed by averaging the value of each of N×N arrays of pixels; and
   third means including means for holding the relative position between the image source and the image sensor for an interval of time required for the second mans to convert the electric signal into the digital information.

2. The image input apparatus as claimed in claim 1, wherein the first means including means for projecting an image segment placed at a fixed position with respect to the image sensor, and the third means including means for holding the image segment at the fixed position for the time interval.

3. The image input apparatus as claimed in claim 2, wherein the third means includes means for moving the image source to bring the image segments to the fixed position in the predetermined sequence.

4. The image input apparatus as claimed in claim 1, wherein the pixels are arranged along axes on the photosensitive surface of the image sensor, and wherein the image is divided into an array of image segments arranged along the set of axes.

5. The image input apparatus as claimed in claim 4, wherein the third means including means for projecting an image segment placed at a fixed position with respect to the image sensor, means for holding the image source at the fixed position for the time interval, and means for moving the image source along the set of axes to bring the image segments to the fixed position in the predetermined sequence.

6. The image input apparatus as claimed in claim 4, wherein the first means includes means for specifying a portion of the image, and means for dividing the specified image portion into image segments each having a size corresponding to the predetermined size of the photosensitive surface.

7. The image input apparatus as claimed in claim 4, wherein the second means includes a random access memory for storing the converted digital information regarding to the projected image segment including the location thereof relative to the set of axes, the random access memory storing the digital information for all of the image segments including the respective locations thereof relative to the set of axes to form information regarding the image.

8. The image input apparatus as claimed in claim 4, wherein the first means includes a telecentric optical system for projecting an image segment onto the photosensitive surface of the image sensor, the telecentric optical system including at least a lens in such a manner that the size of the image focused on the image sensor is unaffected by variations in the distance between a photographic film and the lens.

9. The image input apparatus as claimed in claim 8, wherein the telecentric optical system includes a pair of identical lenses located in a symmetrical arrangement manner so as to eliminate distortions and other asymmetrical aberrations.

10. The image input apparatus as claimed in claim 9, wherein the first means includes a pair of transparent plates for holding the image source therebetween.

11. The image input apparatus as claimed in claim 1, wherein the second means includes a random access memory for storing the minified information regarding to the image segment including the location thereof relative to the set of axes, the random access memory storing minified information for all of the image segments including the respective locations thereof relative to the set of axes to form information regarding a sampled image to which the original image is minified at the predetermined ratio.

12. The image input apparatus as claimed in claim 1, wherein the first means includes means for specifying a portion of the image, and means for dividing the specified image portion into image segments each having a size corresponding to the predetermined size of the photosensitive surface.

13. The image input apparatus as claimed in claim 1, wherein the second means includes a random access memory for storing the converted digital information regarding to the projected image segment including the location thereof relative to axes, the random access memory storing the digital information for all of the image segments including the respective locations thereof relative to the set of axes to form information regarding the image.

14. The image input apparatus as claimed in claim 1, wherein the first means includes a telecentric optical system for projecting an image segment onto the photosensitive surface of the image sensor.

15. The image input apparatus as claimed in claim 14, wherein the telecentric optical system includes a pair of identical lenses located to form a symmetrical arrangement.

16. The image input apparatus as claimed in claim 14, wherein the first means includes a pair of transparent plates for holding the image source therebetween.

17. The image input apparatus as claimed in claim 1, wherein a value of one of each of 16×16 arrays of pixels may be sampled to form the sampled image, and wherein the sampled image may be formed by averaging the value of each of 16×16 arrays of pixels.

18. The image input apparatus as claimed in claim 17, wherein a second memory is used to form a sampled image to which the image segment is minified at a predetermined minification coefficient, the second memory being connected through an address selector to an address converter which serves to address the second memory.

19. The image input apparatus as claimed in claim 1, wherein a second memory is used to form a sampled image to which the image segment is minified at a predetermined minification coefficient, the second memory being connected through an address selector to an address converter which serves to address the second memory.

20. The image input apparatus as claimed in claim 19, wherein in case the sampling coefficient set is 16 and the initial x and y address counts set are 0,0 (row address, column address), the output count value of the address converter increments once from the initial count 0,0 (row address, column address) in a sequence when each time the output count value of the address counter increments times.

21. The image input apparatus as claimed in claim 20, wherein the second memory stores the information regarding the image segment sampled to 1/16 when all of the information regarding the image segment is transferred to the first memory.

* * * * *